(12) United States Patent
Fukuya et al.

(10) Patent No.: US 9,948,867 B2
(45) Date of Patent: Apr. 17, 2018

(54) APPARATUS, METHOD, AND COMPUTER-READABLE STORAGE DEVICE FOR GENERATING COMPOSITE IMAGE

(71) Applicant: OLYMPUS CORPORATION, Tokyo (JP)

(72) Inventors: Yoshiyuki Fukuya, Sagamihara (JP); Kazuo Kanda, Higashiyamato (JP); Nobuyuki Shima, Machida (JP); Tomohiro Hoshino, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 107 days.

(21) Appl. No.: 15/066,422

(22) Filed: Mar. 10, 2016

(65) Prior Publication Data

US 2016/0269652 A1 Sep. 15, 2016

(30) Foreign Application Priority Data

Mar. 10, 2015 (JP) .................................. 2015-047446

(51) Int. Cl.
*H04N 5/235* (2006.01)
*H04N 5/232* (2006.01)
*H04N 5/262* (2006.01)
*H04N 5/265* (2006.01)

(52) U.S. Cl.
CPC ....... *H04N 5/2356* (2013.01); *H04N 5/23216* (2013.01); *H04N 5/23222* (2013.01); *H04N 5/23229* (2013.01); *H04N 5/23293* (2013.01); *H04N 5/265* (2013.01); *H04N 5/2621* (2013.01)

(58) Field of Classification Search
CPC ............. H04N 5/2356; H04N 5/23216; H04N 5/23222; H04N 5/23229; H04N 5/23293; H04N 5/2621; H04N 5/265
USPC ......................................................... 348/239
See application file for complete search history.

(56) References Cited

U.S. PATENT DOCUMENTS

| 2002/0030634 | A1* | 3/2002 | Noda | H04N 1/387 345/5 |
| 2004/0145673 | A1* | 7/2004 | Washisu | H04N 5/23248 348/364 |
| 2008/0112644 | A1* | 5/2008 | Yokohata | H04N 5/23232 382/278 |
| 2009/0135295 | A1* | 5/2009 | Kunishige | H04N 5/23232 348/362 |
| 2009/0262218 | A1* | 10/2009 | Makii | H04N 5/23232 348/239 |
| 2010/0328494 | A1* | 12/2010 | Kim | H04N 5/23293 348/231.99 |

(Continued)

FOREIGN PATENT DOCUMENTS

JP 2014-239299 A 12/2014

*Primary Examiner* — Nhan T Tran
(74) *Attorney, Agent, or Firm* — Scully, Scott, Murphy & Presser, P.C.

(57) ABSTRACT

An apparatus including a processor comprising hardware, wherein the processor is configured to: perform a selection operation of selecting one or more pickup images among a time-sequential series of pickup images; perform a correction operation to correct a brightness of the one or more pickup images selected by the selection operation; and generate a composite image based on: one or more pickup images among the series of pickup images not selected; and a result of the correction operation.

9 Claims, 9 Drawing Sheets

(56) References Cited

U.S. PATENT DOCUMENTS

| | | | | |
|---|---|---|---|---|
| 2014/0168472 A1* | 6/2014 | Sengoku | ............ | H04N 5/23293 |
| | | | | 348/231.99 |
| 2014/0313367 A1* | 10/2014 | Iwasaki | ................ | H04N 5/2356 |
| | | | | 348/222.1 |
| 2016/0105596 A1* | 4/2016 | Hatakeyama | ...... | H04N 5/23229 |
| | | | | 348/239 |

* cited by examiner

APPARATUS, METHOD, AND COMPUTER-READABLE STORAGE DEVICE FOR GENERATING COMPOSITE IMAGE

CROSS-REFERENCE TO RELATED APPLICATION

The present application is based upon and claims the benefit of priority from the prior Japanese Patent Application No. 2015-047446 filed on Mar. 10, 2015. The entire content of Japanese Patent Application No. 2015-047446 is incorporated herein by reference.

BACKGROUND

Field of the Invention

The present invention relates to an apparatus, a method, and a computer-readable storage device which are suitable for a bulb photographing and a composite photographing.

Description of the Related Art

In recent years, portable apparatuses (image pickup apparatuses) with photographing function such as a digital camera have been come into wide use. In such a type of image pickup apparatus, there is an apparatus which includes a display unit and functions to display a photographed image. Furthermore, there is also an apparatus which displays a menu screen in the display unit to help the operation of the image pickup apparatus.

In the image pickup apparatus, there is an apparatus having a bulb photographing function in which the exposure is performed during a period when a shutter button is pushed or between an operation and an operation. With the use of the bulb photographing function, the starry sky or the night sky can be effectively photographed. Furthermore, there is also a commercialized image pickup apparatus having a live bulb function in which not only the finally obtained image but also an image changing during the exposure can be displayed at the time of the bulb photographing.

For example, Japanese Patent Application Laid-open Publication No. 2014-239299 A discloses an apparatus which achieves the live bulb function using an image pickup element performing a destructive reading. In the apparatus of Japanese Patent Application Laid-open Publication No. 2014-239299 A, the exposure and the reading are repeatedly performed plural times, and image signals obtained in each reading are integrated to obtain an image at every predetermined exposure time in the bulb photographing. In such a live bulb function, the user can confirm timing to stop the bulb photographing while viewing the displayed image.

In addition, there is developed an image pickup apparatus having a composite photographing function in which an object is repeatedly photographed to obtain a series of images and a comparison light composition is performed to determine a combining portion according to the feature of a series of images thus obtained so as to obtain the same effect as that of the bulb photographing.

SUMMARY

The image pickup apparatus according to an embodiment of the invention includes an image pickup unit that repeatedly picks up an object and outputs a series of pickup images for composition, an accumulation control unit that is used to accumulate the plurality of pickup images, an operation determination unit that accepts an operation of selecting a predetermined image among the plurality of pickup images, a correction unit that corrects a brightness of the selected image, and a combining unit that combines the series of pickup images containing the corrected image and outputs the composite image.

In addition, a composite photographing method according to another embodiment of the invention includes an image pickup step of repeatedly picking up an object and acquiring a series of pickup images for composition, an accumulation control step of accumulating the plurality of pickup images, an operation determination step of accepting an operation of selecting a predetermined image among the plurality of pickup images, a correction step of correcting a brightness of the selected image, and a combining step of combining the series of the pickup images containing the corrected image and outputting the composite image.

In addition, a computer-readable storage device, according to another embodiment of the invention, storing a composite photographing program, executed by a computer, causes the computer to perform an image acquisition step of repeatedly picking up an object and acquiring a series of pickup images for composition, an accumulation control step of accumulating the plurality of pickup images, an operation determination step of accepting an operation of selecting a predetermined image among the plurality of pickup images, a correction step of correcting a brightness of the selected image, and a combining step of combining the series of the pickup images containing the corrected image and outputting the composite image.

According to the embodiments disclosed, the composite image less influenced from the unnecessary light is simply acquired by making it possible to designate a correcting image among from a plurality of images continuously acquired at the time of the photographing.

DETAILED DESCRIPTION

Hereinafter, embodiments of the invention will be described in detail with reference to drawings.

First Embodiment)

Figure 1:
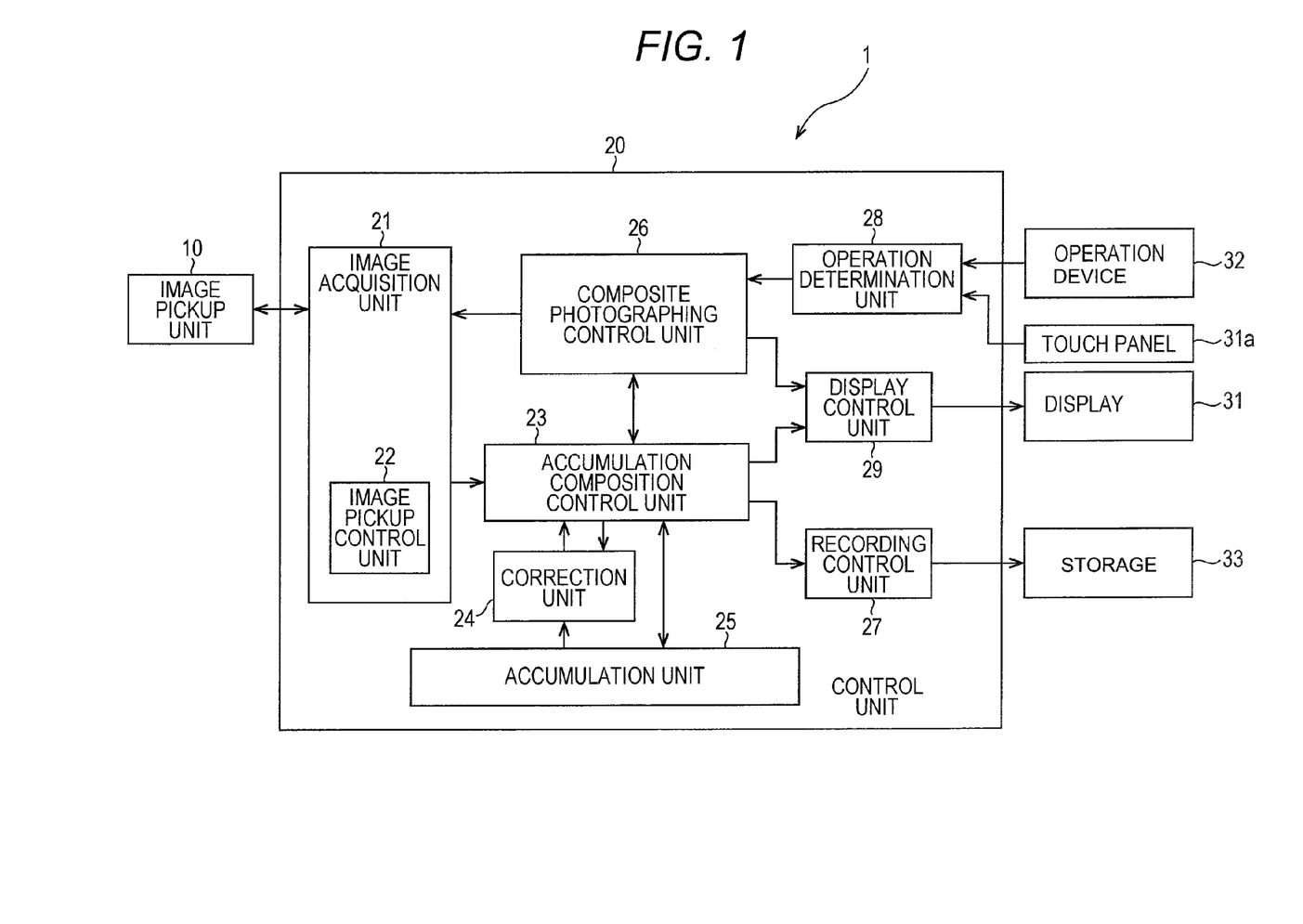
FIG. 1 is a block diagram illustrating circuit components of an image pickup apparatus according to a first embodiment of the invention.

FIG. 1 is a block diagram illustrating circuit components of an image pickup apparatus according to a first embodiment of the invention. In an image composite photographing such as a bulb photographing or a composite photographing in which one object is repeatedly picked up to obtain a series of images, an image pickup apparatus 1 in this embodiment can obtain a composite image less influenced from an image portion containing unnecessary light.

In FIG. 1, the image pickup apparatus 1 can include an image pickup unit 10 and a control unit 20. The image pickup unit 10 can include an image pickup sensor (not illustrated) such as a CCD or a CMOS sensor, and an optical system (not illustrated) which can introduce an optical image of an object to an image pickup face of the image pickup sensor. The optical system can include a zooming lens, a focusing lens, and a diaphragm.

The control unit 20 as a hardware may be configured by a processor such as a CPU (not illustrated), and configured to make control on each component according to a program stored in a memory (not illustrated). A pickup image from the image pickup unit 10 can be provided to the control unit 20. An image acquisition unit 21 is configured to acquire an image from the image pickup unit 10. An image pickup control unit 22 can be provided in the image acquisition unit 21, and the image pickup control unit 22 can control the image pickup unit 10. The image pickup control unit 22 can drive and control the image pickup sensor and the optical system of the image pickup unit 10. For example, the image pickup control unit 22 can drive the zooming lens, the focusing lens, and the diaphragm to change a zooming rate, a focusing position, and an opening of the diaphragm. In addition, the image pickup control unit 22 is configured to drive and control the image pickup element of the image pickup unit 10 so as to acquire a pickup image from the image pickup sensor. In addition, when reading pixel signals out of the image pickup sensor, the image pickup control unit 22 may add or thin the pixel signals as needed, and output the result signal.

Furthermore, in this embodiment, the image pickup control unit 22 can control the image pickup unit 10 to make it possible to perform a photographing control for the bulb photographing or the composite photographing in which one object is repeatedly picked up to obtain a series of pickup images. In this way, the image acquisition unit 21 can acquire a series of pickup images.

The plurality of images acquired by the image acquisition unit 21 can be provided to an accumulation composition control unit 23. The accumulation composition control unit 23 may perform a predetermined signal processing (for example, color adjustment processing, matrix conversion processing, noise removal processing, and various other signal processing) on the input image. The accumulation composition control unit 23 can output the signal-processed image to a recording control unit 27 and a display control unit 29.

At the time of a composite photographing mode such as the bulb photographing or the composite photographing, the accumulation composition control unit 23 can be controlled by a composite photographing control unit 26 to provide the plurality of input images to an accumulation unit 25, and combine the sequentially-input pickup images and provide the combined image to the accumulation unit 25. The accumulation unit 25 can be controlled by the accumulation composition control unit 23 so as to store the image provided from the accumulation composition control unit 23, and output the stored image to the accumulation composition control unit 23 and a correction unit 24.

The accumulation composition control unit 23 can provide the pickup image acquired from the image acquisition unit 21 to the accumulation unit 25 for storage, and can generate a composite image obtained by combining the image accumulated in the accumulation unit 25 and the pickup image acquired from the image acquisition unit 21.

Furthermore, the accumulation unit 25 may generate a composite image obtained by combining a plurality of images stored in the accumulation unit 25. Therefore, the accumulation composition control unit 23 can combine only predetermined images among a series of pickup images obtained through the composite photographing of the image pickup unit 10.

In this embodiment, the correction unit 24 can be provided in order to reduce an influence of an image which is determined as being unnecessary in the composite photographing. The correction unit 24 can be controlled by the accumulation composition control unit 23 to correct the image stored in the accumulation unit 25 and then provide the corrected image to the accumulation composition control unit 23. For example, the correction unit 24 may perform a process of reducing a level of an image signal with respect to the unnecessary image among the images accumulated in the accumulation unit 25. Therefore, the correction unit 24 can reduce a brightness of the image accumulated in the accumulation unit 25 and provide the image to the accumulation composition control unit 23.

Further, various methods can be considered as a method of reducing the brightness through the correction unit 24. For example, the correction unit 24 may reduce the brightness of the image by a predetermined rate. In addition, the correction unit 24 may uniformly reduce the brightness of the entire images, or may differently reduce the brightness of each portion of the image by a rate corresponding to the brightness. In addition, the correction unit 24 may correct the image determined as being necessary among the images accumulated in the accumulation unit 25 such that the brightness of the image is increased.

The user can select the unnecessary image by an operation device 32 or a touch panel 31a, and an operation determination unit 28 can provide a signal based on s user's selection to the composite photographing control unit 26. The composite photographing control unit 26 can instruct the accumulation composition control unit 23 to set the image based on the user's selection as the unnecessary image. The accumulation composition control unit 23 can give an instruction to the correction unit 24 to correct the image designated as the unnecessary image.

The accumulation composition control unit 23 can generate the composite image using the image accumulated in the accumulation unit 25 and the image corrected by the correction unit 24. Therefore, the accumulation composition control unit 23 can generate the composite image less influenced from the image portion containing the unnecessary light is reduced. The accumulation composition control unit 23 can output the generated composite image to the recording control unit 27 and the display control unit 29. As a storage 33, various recording mediums can be employed. For example, in a case where a card interface is employed as the storage 33, the recording control unit 27 can record the image in a recording medium such as a memory card.

The display control unit 29 can perform various processes related to displaying. The display control unit 29 can provide the given image to a display 31 for displaying. The display 31 can include a display screen 31b (see FIG. 5) such as an LCD, and can display the image provided from the display control unit 29. In addition, the display control unit 29 can cause the display screen 31b of the display 31 to display various menus.

In this embodiment, the display control unit 29 can be controlled by the composite photographing control unit 26 at the time of the composite photographing mode, and can display the image provided from the accumulation composition control unit 23 as a thumbnail. Further, the display screen 31b of the display 31 is provided along the rear surface of a casing 1a (see FIG. 5) of the image pickup apparatus 1. A photographer can confirm a through image or a thumbnail displayed on the display screen 31b of the display 31 during the photographing, and can perform the photographing operation while confirming the through image or the like.

The operation determination unit 28 can accept a user operation on the operation device 32 containing a shutter button (not illustrated), a function button, and various switches for setting a photographing mode. In addition, the touch panel 31a can be provided on the display screen 31b of the display 31. The touch panel 31a can generate an operational signal according to a position or a slide operation on the display screen 31b performed by fingers of the user. The operational signal can be also supplied to the operation determination unit 28. The operation determination unit 28 can determine the operation on the operation device 32 and the touch panel 31a, and can provide the determination result to the composite photographing control unit 26. In this way, the composite photographing control unit 26 can perform the control of each unit in the composite photographing according to the instruction of the user.

Figure 2:
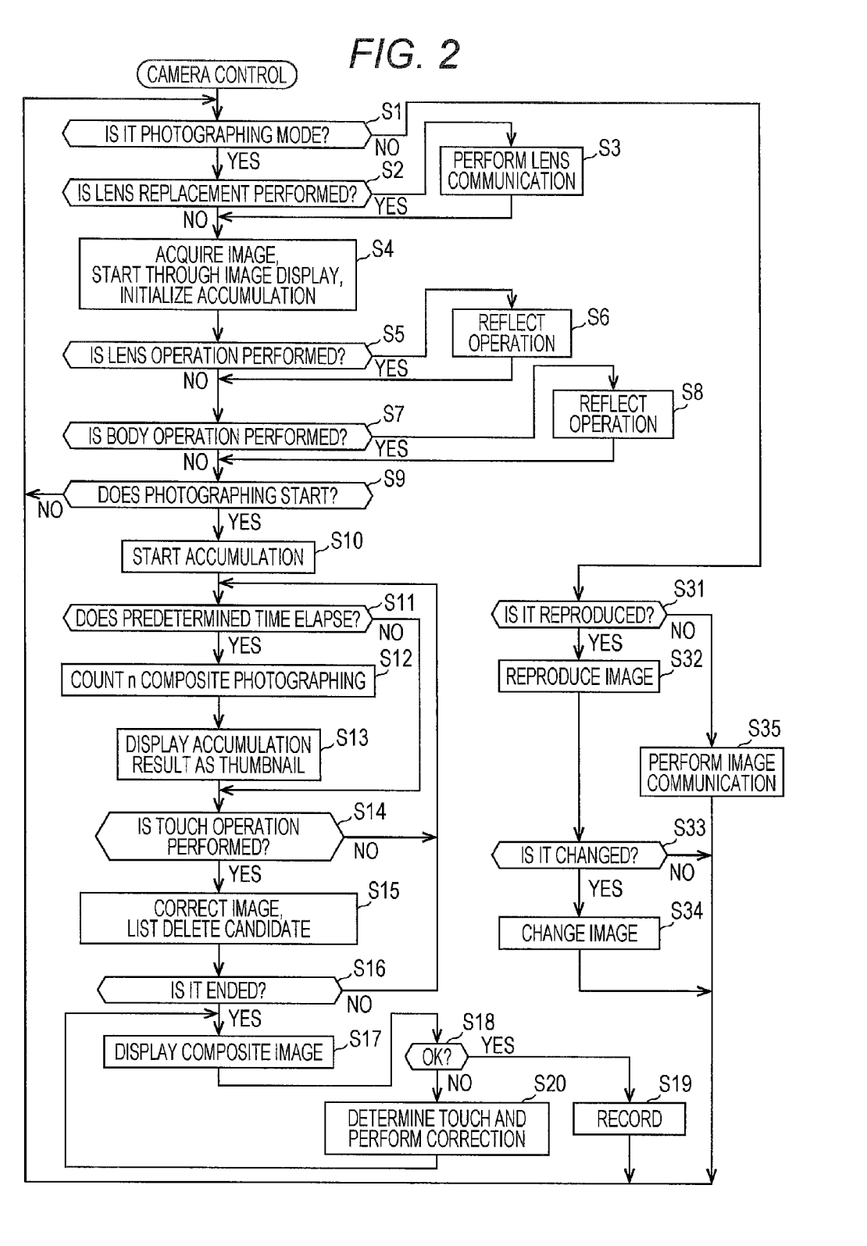
FIG. 2 is a flowchart for describing a camera control.

Next, the operation of the embodiment having such a configuration will be described with reference to FIGS. 2 to 6. FIG. 2 is a flowchart for describing a camera control. In addition, FIGS. 3A to 3D and FIGS. 4A and 4B are diagrams for describing the first embodiment, which illustrate the outline of a method of creating the composite image. In addition, FIGS. 5 and 6 are diagrams illustrating an example of a menu.

In Step S1 of FIG. 2, the control unit 20 can determine whether the photographing mode is instructed. In a case where the photographing mode is not instructed, the control unit 20 can determine that a reproduction mode is designated (Step S31). When the reproduction mode is instructed, the control unit 20 can reproduce a designated image in Step S32. The control unit 20 can determine whether the reproduction image is instructed to be changed in Step S33. In a case where a change is instructed, the reproduction image can be changed into the designated image and reproduced (Step S34). In addition, in a case where the reproduction mode is not instructed, the control unit 20 can transfer the mode to an image communication mode in Step S35.

On the other hand, when the photographing mode is instructed, the control unit 20 can determine whether a lens replacement is performed in Step S2. In a case where the lens replacement is performed, the control unit 20 can perform a lens communication with respect to the image pickup unit 10 to acquire information on the optical system and the image pickup sensor of the image pickup unit 10, and sets the optical system and the image pickup sensor according to a user operation (Step S3).

Figure 5:
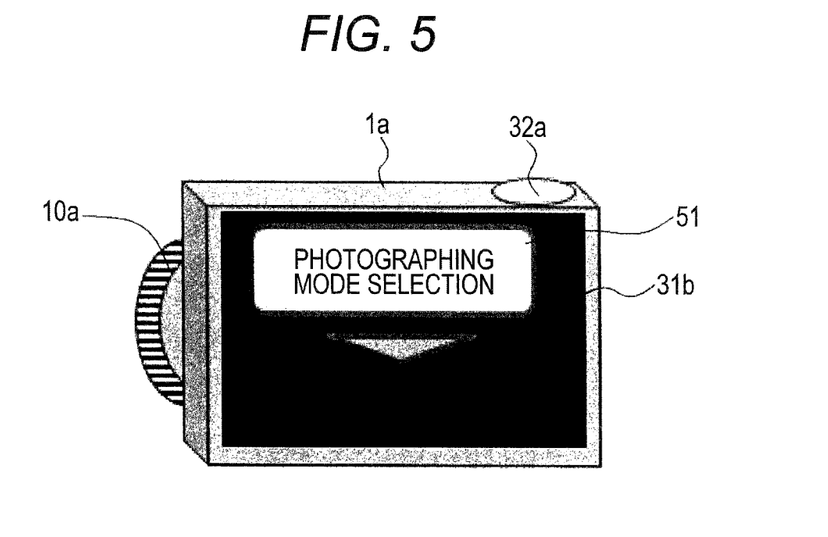
FIG. 5 is a diagram illustrating an example of a menu.
Figure 6:
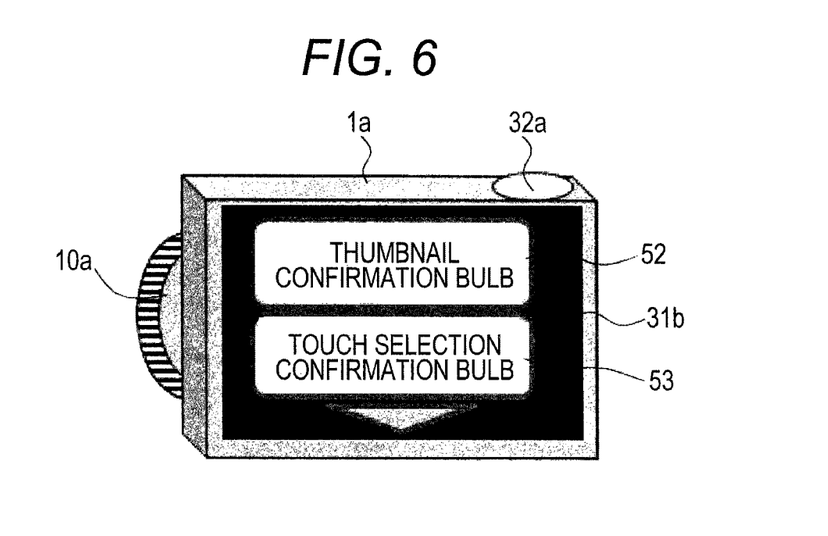
FIG. 6 is a diagram illustrating an example of a menu.

In the photographing mode, the display control unit 29 of the control unit 20 may display a menu illustrated in FIG. 5 for example. As illustrated in FIG. 5, a selection display 51 for selecting the photographing mode can be displayed on the display screen 31b provided in the rear surface of the casing 1a of the image pickup apparatus 1. When a touch operation is performed on the selection display 51, the display control unit 29 can display a menu illustrated in FIG. 6 for example. In FIG. 6, selection displays 52 and 53 for selecting the composite photographing mode can be displayed on the display screen 31b. Further, the selection display for selecting other photographing modes such as a normal photographing mode can be displayed by scrolling the screen which is not illustrated. The selection display 52 can be used to designate a thumbnail confirmation bulb photographing mode, and the selection display 53 can be used to select a touch selection confirmation bulb photographing mode. Further, this embodiment is described to show an example of the thumbnail confirmation bulb photographing mode, and the touch selection confirmation bulb photographing mode will be described in a third embodiment below.

In this case, the thumbnail confirmation bulb photographing mode of the composite photographing mode can be designated as the photographing mode. In Step S4, the composite photographing control unit 26 can control the image pickup control unit 22 to make the image pickup unit 10 start picking up an image. The composite photographing control unit 26 can control the image acquisition unit 21 to acquire the pickup image from the image pickup unit 10, and can provide the acquired pickup image to the accumulation composition control unit 23. The accumulation composition control unit 23 can perform a predetermined signal processing on the acquired pickup image and then provides the pickup image to the display control unit 29. The display control unit 29 can display the pickup image on the display screen 31b of the display 31.

Next, the control unit 20 can determine whether there is a lens operation in Step S5. In a case where there is a lens operation, the control unit 20 can perform a control according to the lens operation, and reflects the operation result (Step S6). Next, the control unit 20 can determine whether there is a body operation in Step S7. In a case where there is a body operation, the control unit 20 can perform a control according to the body operation, and can reflect the operation result (Step S8).

Next, the control unit 20 can determine whether the composite photographing is started in Step S9. For example, the composite photographing can be started when the user pushes a shutter button 32a. At the time of the composite photographing mode, the respective units can be controlled by the composite photographing control unit 26, and the composite photographing can be performed. The accumulation of the pickup images picked up by the image pickup unit 10 can be started (Step S10).

In other words, the image pickup unit 10 can be controlled by the image pickup control unit 22 to repeatedly pick up the one object, and can output a series of pickup images. The image acquisition unit 21 can sequentially acquire the plurality of pickup images obtained by photographing one object and can output the pickup images to the accumulation composition control unit 23. The accumulation composition control unit 23 can sequentially store the input pickup images in the accumulation unit 25.

The accumulation composition control unit 23 can determine whether an exposure time necessary for one time of the composite photographing elapses in Step S11, can count up n frames of the composite photographing at every time when the exposure time necessary for one time of the photographing elapses in Step S12, and can display the accumulation result as a thumbnail in Step S13. In other words, the accumulation composition control unit 23 sequentially generates the integrated images by integrating the image signals while accumulating the pickup images in the accumulation unit 25. The accumulation composition control unit 23 can provide the integrated image of the accumulation result to the display control unit 29. The display control unit 29 can generate a thumbnail image of the input integrated image in Step S13, and can provide the thumbnail image to the display 31 for displaying. Of course, the thumbnail image created herein may be the image before the combining, and in a case where the image is characters written by a penlight, it can be difficult to distinguish which one is useful or useless when the components of the respect parts of the characters are arranged. However, a logical load is lightened in the case of outputting a material image before the combining. Therefore, it can be effective to simplify the system or to save energy. In addition, in a case where the process branches to No in Step S16, the correction may be not performed on the composition.

Figure 3A:
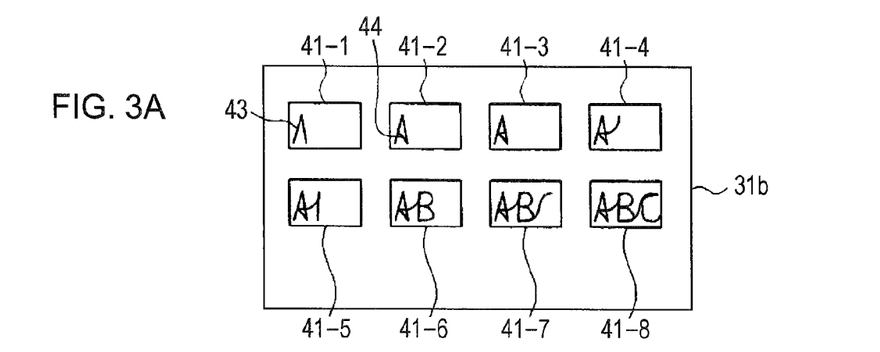
FIGS. 3A to 3D are diagrams for describing the first embodiment.

FIGS. 3A to 3D illustrate an example of such a thumbnail, in which a display example on the display screen 31$b$ can be illustrated in a case where the characters written in a space using the penlight is picked up through the composite photographing. In FIGS. 3A to 3D, the number n of frames of the composite photographing is 8, and the example in a case where the characters "ABC" are written in the space using the penlight is illustrated. As illustrated in FIG. 3A, when the first frame of the composite photographing is ended, a thumbnail 41-1 can be displayed in the display screen 31$b$. Next, the second frame of the composite photographing is ended, the first frame of the pickup image and the second frame of the pickup image can be integrated, and a thumbnail 41-2 based on the integrated image can be displayed in the display screen 31$b$. Further, in FIG. 3A, an image portion 43 of the thumbnail 41-1 can be a portion obtained from the first frame of the photographing, and an image portion 44 of the thumbnail 41-2 can be a portion obtained from the second frame of the photographing.

Next, when a third frame of the composite photographing is ended, the integrated image of the first and the second frames and the third frame of the pickup image can be integrated, and a thumbnail 41-3 based on the integrated image can be displayed in the display screen 31$b$. Hereinafter, similarly, at every time when each frame of the photographing is ended, thumbnails 41-4 to 41-8 (hereinafter, referred to as the thumbnail 41 in a case where there is no need to distinguish the respective thumbnails) can be sequentially added and displayed. In this way, a list of intermediate results can be displayed by displaying the thumbnails of the composite intermediate images before the combining is completed, so that the user can view the image time-sequentially, and a target image can be immediately retrieved or found out. In addition, the result before the combining may be displayed, but the background is not sufficiently combined and thus hardly confirmed in a case where the image is dark. In addition, in a case where the image is characters written by the penlight, it can be difficult to distinguish which one is useful or useless when only the components (pieces) of the respective parts of the characters are arranged. Herein, since the intermediate result after the combining is displayed, it can be confirmed that the background is gradually brightened, the useful or useless portion can be easily confirmed from the procedure of forming the characters, and a wrong operation can be prevented.

The composite photographing control unit 26 can determine whether the user performs the touch operation in Step S14. In a case where there is no touch operation by the user, the process returns to Step S11, the respective frames in the composite photographing are repeatedly photographed and displayed as the thumbnails. In a case where there is no unnecessary image in the image composition (integration) of the composite photographing or a case where the unnecessary image is designated, the user performs, for example, the touch operation using the touch panel 31$a$. For example, the user may designate a frame of the pickup image corresponding to the thumbnail 41 at a position where the user touches the thumbnail 41, as the unnecessary image for the image composition. In addition, in a case where there is no unnecessary image for the image composition, the user may touch a portion other than the display area of the thumbnail 41.

Figure 3B:
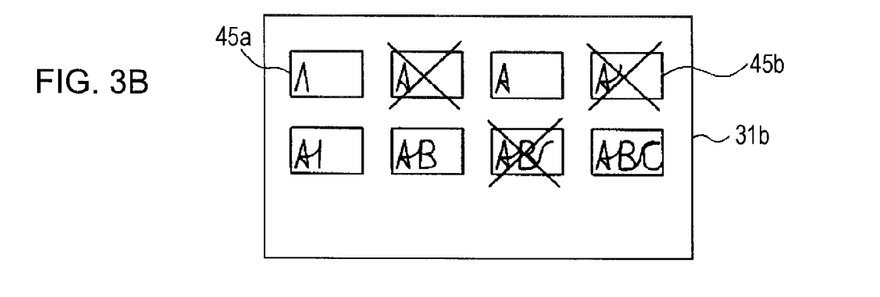

FIG. 3B illustrates an example in which the user designates the unnecessary image for the image composition. The display control unit 29 can mark the thumbnail 41 corresponding to the integrated image designated by the user with "x". In other words, a thumbnail 45$b$ marked with "x" in FIG. 3B indicates the unnecessary frame for the image composition designated by the user, and a thumbnail 45$a$ marked with no "x" in FIG. 3B indicates the thumbnail corresponding to the frame used in the image composition. In the example of FIG. 3B, the images obtained by the photographing of the second frame, the fourth frame, and the seventh frame become targets for the correction.

When the user designates the unnecessary image for the image composition, the composite photographing control unit 26 can instruct the accumulation composition control unit 23 to correct the frame corresponding to the designated integrated image and to perform the image composition. In Step S15, the accumulation composition control unit 23 can control the correction unit 24 to acquire the corrected image of the image selected by the user, and can generate the composite image using the corrected image and the uncorrected image.

Figure 3C:
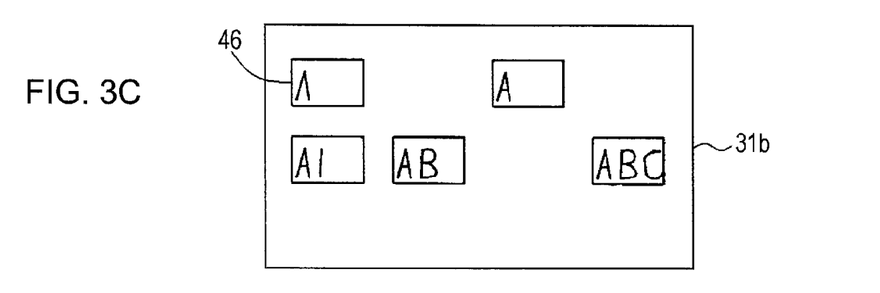
Figure 3D:
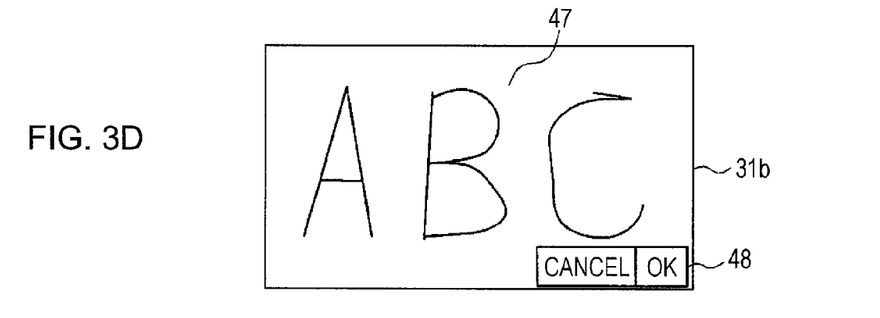
Figure 4A:
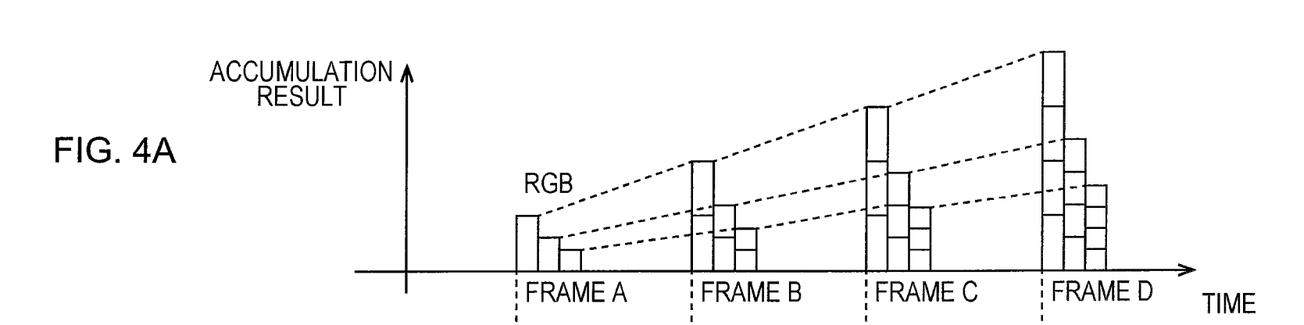
FIGS. 4A and 4B are diagrams for describing the first embodiment.
Figure 4B:
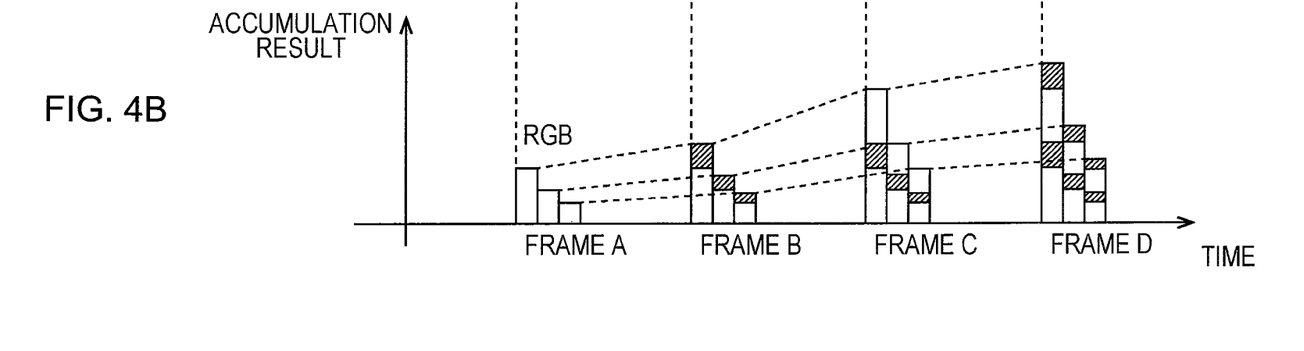

FIGS. 4A and 4B are diagrams schematically illustrating an example in which the light from the object is converted into an electric signal through photoelectric conversion and the accumulation and the integration are performed thereon. In this case, it can be assumed that the result is obtained from a specific image in the screen. In FIGS. 4A and 4B, the horizontal axis represents time at an interval of a predetermined time period (one time of photographing), and the vertical axis represents the integration result, in which an example of correction performed by the correction unit 24 is illustrated. FIG. 4A illustrates an example in a case where no correction is performed, and FIG. 4B illustrates an example in which the image signal to be integrated is corrected to be lowered in its signal level. Frames A to D of FIGS. 4A and 4B show the image signals (R, G, B signals) obtained by picking up the images of the first to the fourth frames of FIGS. 3A to 3D. Compared to the example in which the correction illustrated in FIG. 4A is performed, the image signals of Frames B and D are lowered in their levels as illustrated with the hatched portions in FIG. 4B, and then integrated.

FIG. 3C illustrates an example in which the correction unit 24 sets the level of the image signal of the unnecessary image designated by the user to be 0. In other words, this case is equivalent to a case where the unnecessary image designated by the user is deleted and the image composition is performed. As illustrated in FIG. 3C, thumbnails 46 based on the pickup images except the pickup images (frames) designated as being unnecessary are the integrated images obtained by the pickup images except the pickup images of the second, fourth, and seventh frames. Herein, as a result of deleting the pickup images designated as being unnecessary, the composition can be corrected again and displayed, but only the finally desired image may be displayed. Of course, since the correction of the composition of the images in the middle of processing causes a load on the processing, there is no need to obtain an exact image. The specification may be modified to keep a balance between an increase in size of the system, an energy saving problem, and a processing time. However, since a change of the intermediate image can be ascertained in real time in the example of updating Step S13 by the operation of Step S15 of FIG. 2, a wrong operation is reliably ascertained with ease.

In the example of FIGS. 3A to 3D, the user can easily make a determination with reference to the thumbnail 41, for example, about that the image portion between strokes is obtained by the pickup image of the second frame, and the image portion between the characters is obtained by the pickup image of the fourth frame. The user can designate the unnecessary pickup image with a simple operation. The composite photographing control unit 26 may obtain the composite image using the pickup images corrected in the designated frame at every time when the user designates the unnecessary pickup image, and display the thumbnail 41 based on the composite image.

In this embodiment, as illustrated in FIGS. 3A to 3D, the unnecessary pickup image is easily recognized by displaying the integrated image as the thumbnail.

Further, in the example of FIGS. 3A to 3D, the description has been made about an example in which the integrated image after the composition is used as the thumbnail. However, the accumulation composition control unit 23 may use the pickup image of each frame as the thumbnail without combining the images. In general, it is considered that the unnecessary pickup image is easily determined when the integrated image is displayed as the thumbnail. However, the unnecessary pickup image may be easily determined when the pickup image of each frame is displayed as the thumbnail depending on a scene. Therefore, the composite photographing control unit 26 may control a display way of the display state, for example, by an operation of the user.

In addition, FIGS. 3A to 3D illustrate the example in which the pickup images determined as being unnecessary and the pickup images determined as being necessary are picked up by different frames. In this case, as illustrated in FIG. 3C, the unnecessary pickup images may be corrected by being deleted, but in a case where the pickup images determined as being unnecessary and the pickup images determined as being necessary are mixed in one frame of the photographing, it can be considered that a natural composite image is obtained when a correction process such as a process of lowering the brightness level is performed.

The composite photographing control unit 26 can determine whether the composite photographing is ended in Step S16. In a case where the composite photographing is not ended, the composite photographing control unit 26 can return the process to Step S11, and can repeatedly perform Steps S11 to S16. In a case where the composition photographing is ended by the user, or when a predetermined period of the composite photographing elapses, the composite photographing control unit 26 can transfer the process to Step S17, and can display the composite image which is performed before the final recording.

FIG. 3D illustrates a composite image 47 which is displayed in the display screen 31b. As illustrated in FIG. 3C, the composite image 47 of FIG. 3D is the integrated image obtained by the respective pickup images except the pickup images of the second, fourth, and seventh frames, in which the image portions determined as being unnecessary are deleted by the user.

The composite photographing control unit 26 can transfer the process to Step S18 after the composite image is displayed, and can determine whether the user satisfies the displayed composite image. As illustrated in FIG. 3D, a button 48 for determining whether the user satisfies the displayed composite image can be displayed on the display screen 31b. When the user touches a display portion of "OK", the composite photographing control unit 26 can transfer the process to Step S19 and perform a recording process. The accumulation composition control unit 23 can provide the composite image to the recording control unit 27 to be recorded in the storage 33. Further, the accumulation composition control unit 23 may record the respective frames of images. In addition, when the user touches a display portion of "Cancel", the composite photographing control unit 26 can transfer the process to Step S20 and performs a touch determination and correction process. The touch determination and correction process in Step S20 can be the same processes as those of Steps S14 and S15, and the accumulation composition control unit 23 can cancel the user's designation of the intermediate image performed in Step S14, urges the user to select an unnecessary image again, corrects the selected image, and then combines the corrected image and the uncorrected image. Therefore, the image composition process can be repeatedly performed until the user's desired composite image is obtained.

Further, in FIG. 2, the description has been made about the example in which the image composition is performed after the unnecessary pickup image is designated and corrected in a period between the start and the end of the composite photographing and a period after the composite photographing is ended. However, the image composition may be performed after the unnecessary pickup image is designated and corrected only in any one of a period between the start and the end of the composite photographing and a period after the composite photographing is ended. For example, in a case where only one cycle of the image composition process is allowed after the unnecessary pickup image is designated and corrected only in a period between the start and the end of the composite photographing, the frames before the user's designated frame may be deleted after the image composition. In this case, the storage capacity of the accumulation unit 25 may be reduced.

In this way, in this embodiment, the correcting pickup image can be designated from among a plurality of pickup images continuously acquired in the composite photographing, and the composite image less influenced from the unnecessary light can be simply acquired. In addition, the user can designate the corrected image with reference to the thumbnail based on the composite image sequentially displayed at every photographing of each frame, so that the pickup image considered as being unnecessary for the image composition can be easily determined. Therefore, it can be possible to simply obtain a desired composite image.

(Second Embodiment)

Figure 7:
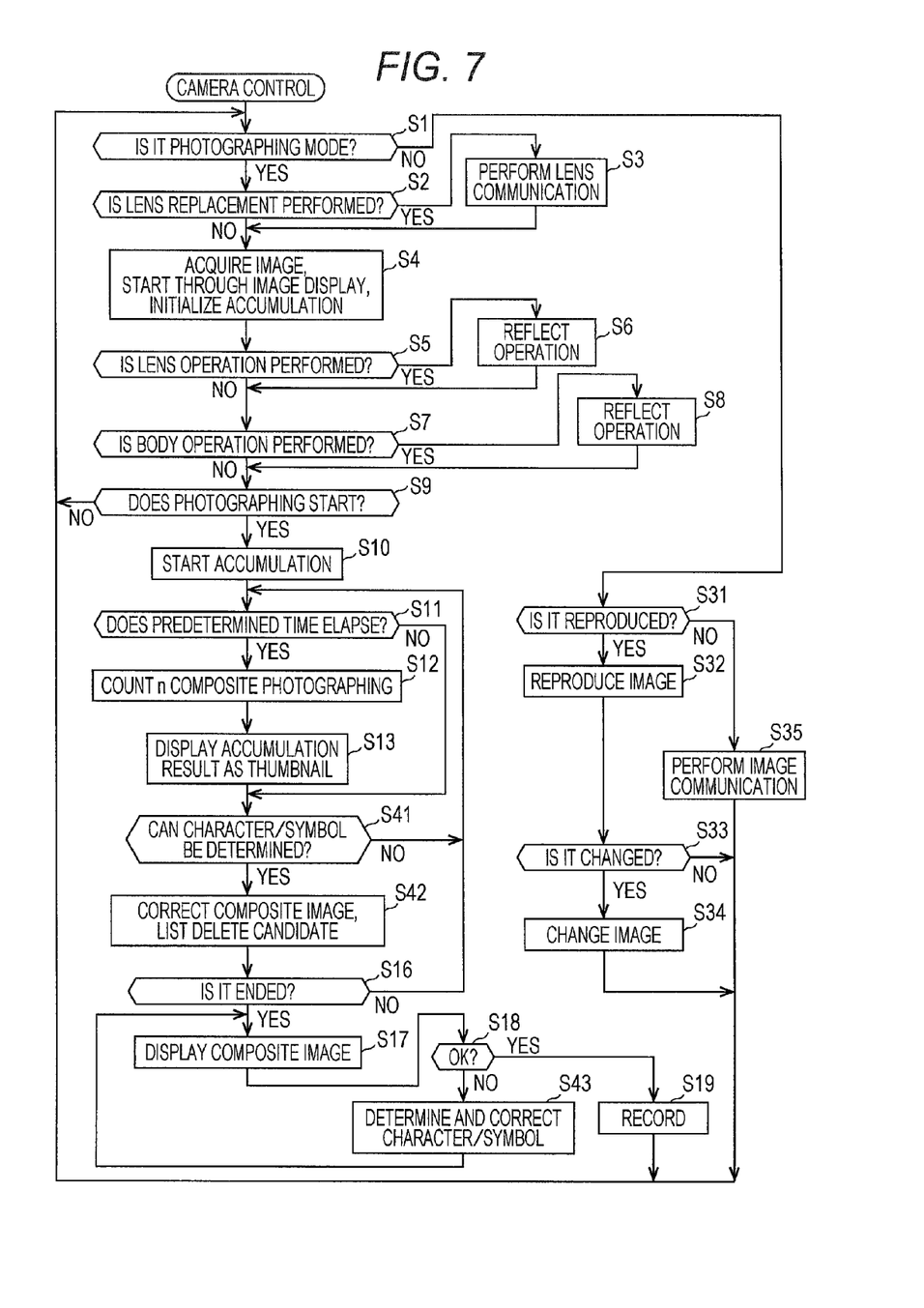
FIG. 7 is a flowchart illustrating an operation flow employed in a second embodiment of the invention.

FIG. 7 is a flowchart illustrating an operation flow employed in a second embodiment of the invention. In FIG. 7, the same steps as those in FIG. 2 are denoted with the same symbols, and the description thereof will not be repeated. The hardware configuration of this embodiment is the same as that of the first embodiment. In the first embodiment, the description has been made about the example in which the user designates the image containing the light unnecessary for the image composition. In this embodiment, the composite photographing control unit 26 can determine the image portion containing the unnecessary light, for example, in an automatic manner, and can delete the image portion from the composite image, so that a desired composite image is obtained.

In this embodiment, the composite photographing control unit 26 can receive the integrated image from the accumulation composition control unit 23, and be configured to recognize a character portion contained in the composite image, a portion between characters, and a portion between strokes (hereinafter, referred to as an unnecessary portion)

using a handwritten character stroke recognition dictionary stored in a memory (not illustrated). The composite photographing control unit 26 can give an instruction to delete the unnecessary portion to the accumulation composition control unit 23. Therefore, the accumulation composition control unit 23 can control the correction unit 24 in order to delete the unnecessary portion from the composite image. The correction unit 24 can be controlled by the accumulation composition control unit 23, can perform the correction such that the level of the image signal of the unnecessary portion of the integrated image read out of the accumulation unit 25 becomes 0 or can be sufficiently lowered, and can output the correction image to the accumulation composition control unit 23.

In the embodiment having such a configuration, the composite photographing control unit 26 can determine whether a character/symbol is determined in Step S41 of FIG. 7. The processes of Steps S11 to S13 will be repeatedly performed until the character/symbol is determined. When the character/symbol is determined from the composite image in Step S41, the composite photographing control unit 26 can determine the unnecessary portion contained in the composite image, and can give the instruction to delete the unnecessary portion to the accumulation composition control unit 23.

For example, the image of the first frame corresponding to the thumbnail 41 of FIG. 3A, the integrated image of the first and the second frames, and the integrated image of the first to the third frames are assumed to be sequentially given from the accumulation composition control unit 23 to the composite photographing control unit 26. In this case, the composite photographing control unit 26 can determine whether the image portion of the character "A" in the integrated image and the image portion corresponding to the image portion 44 in the thumbnail 41-2 are contained at the stage when the integrated image of the first to the third frames are input. The composite photographing control unit 26 can give an instruction to delete the image portion corresponding to the image portion 44 from the integrated image to the accumulation composition control unit 23. The accumulation composition control unit 23 can control the correction unit 24 to correct the integrated image of the first to the third frames so as to generate the composite image of only the character portion.

Hereinafter, the operations of Steps S11 to S13, S41, and S42 are repeated, and when it is determined that the composite photographing in Step S16 is ended, the composite image after the correction is displayed on the display screen 31b. Therefore, even in this case, the same composite image similar to FIG. 3D is obtained.

When it is determined that the user touches a display portion of "Cancel" of FIG. 3D in Step S18, the composite photographing control unit 26 can transfer the process to Step S43 to perform a character/symbol determination and correction process. The character/symbol determination and correction process in Step S43 can be a process similar to the processes of Steps S41 and S42, and the composite photographing control unit 26 can cancel the designation of the unnecessary portion in Step S41, can determine the unnecessary portion again, and can obtain the composite image obtained by correcting the image portion determined as the unnecessary portion. Therefore, the image composition process can be repeatedly performed until the user's desired composite image is obtained.

In this way, this embodiment can obtain the same effect as that of the first embodiment. Furthermore, in this embodiment, there is no need for the user to designate the unnecessary portion in order to obtain the composite image from which the unnecessary portion is automatically deleted. In addition, in this embodiment, the unnecessary portion of the composite image can be automatically determined and deleted for the image correction, and even in a case where the unnecessary portion is photographed and has an influence over a plurality of frames, it can be possible to obtain the composite image from which the unnecessary portion is clearly deleted.

Further, in this embodiment, the description has been made about the example in which the unnecessary portion is determined by the character contained in the integrated image, but the unnecessary portion of other images can be determined as long as the image has a predetermined regularity. For example, in a case where the night sky is subjected to the composite photographing, since stars have the regularity in their traces in the sky, the trace of light according to the movement of an airplane may be determined for example. Even in this case, this embodiment can be applied.

(Third Embodiment)

Figure 8:
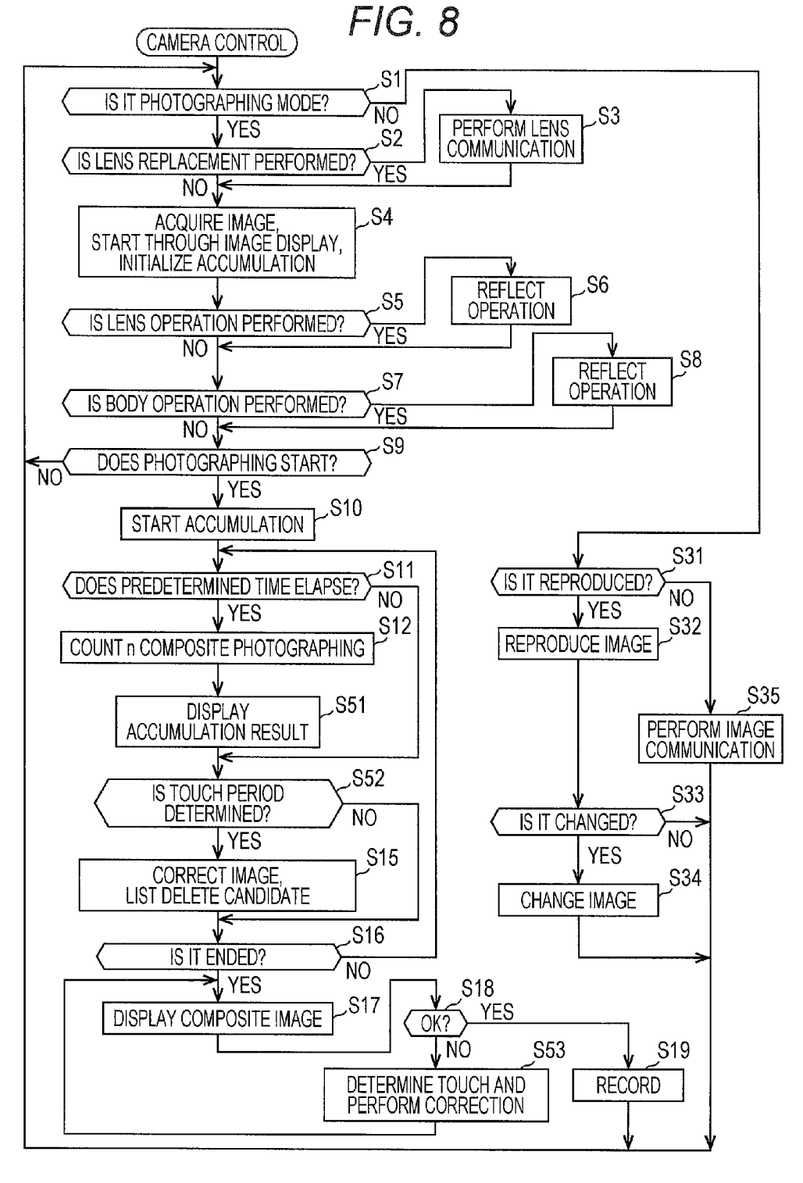
FIG. 8 is a flowchart illustrating an operation flow employed in a third embodiment of the invention.

FIG. 8 is a flowchart illustrating an operation flow employed in the third embodiment of the invention. In FIG. 8, the same sequences as those in FIG. 2 will be denoted with the same symbols, and the description thereof will not be repeated. In addition, FIGS. 9 to 12B are diagrams for describing the third embodiment. The hardware configuration in this embodiment can be similar to the first embodiment. In this embodiment, the image to be integrated during a touch period of the user can be corrected.

In this embodiment, when the touch operation of the user is detected during the composite photographing, the composite photographing control unit 26 can control the accumulation composition control unit 23 such that the pickup image to be integrated during a period corresponding to the touch detection period is corrected and then integrated. For example, the accumulation composition control unit 23 can control the correction unit 24 to lower the level of the image signal of the pickup image to be integrated during the period corresponding to the touch detection period, and to provide the image signal to the accumulation composition control unit 23.

Figure 9:
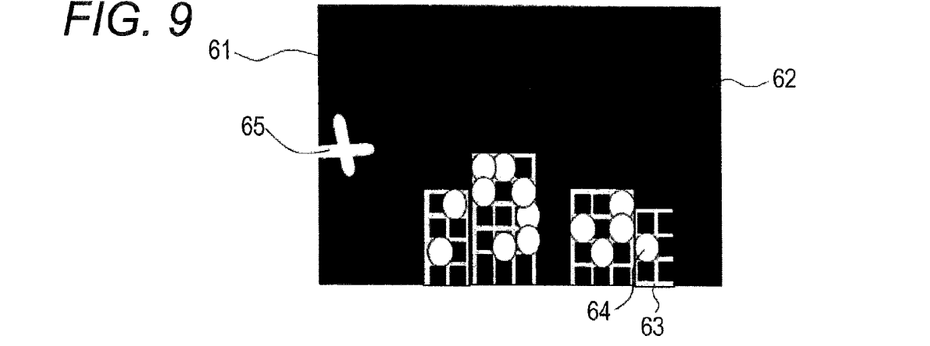
FIG. 9 is a diagram for describing the third embodiment.

In the embodiment having such a configuration, the composite photographing control unit 26 can control to display the composite image of the integration result in Step S51 of FIG. 8. FIG. 9 illustrates an example of the integrated image in this case, and the integrated image 61 of FIG. 9 illustrates the image obtained at the first in the composite photographing or the intermediate composite image. The integrated image 61 is the image photographed by combining the night sky.

The integrated image 61 can include an image portion 62 of the night sky, an image portion 63 of a building, and an image portion 64 indicating a light spot such as the light filtering out of a window of the building. Furthermore, the integrated image 61 also can include an image portion 65 indicating the light of an airplane 65. Further, the airplane 65 can be assumed to be photographed such that it flies to draw a track from the left side of the sheet toward the right side in the image 61 of FIG. 9.

The composite photographing control unit 26 can determine whether there is a touch operation of the user in Step S52. In a case where there is a touch operation, a period (a touch operation period) of the touch operation is obtained. Further, in a case where the touch operation of the user is not detected, the composite photographing control unit 26 can transfer the process to Step S16 and determine whether the composite photographing is ended. In a case where it is determined that there is a touch operation in Step S52, the composite photographing control unit 26 can obtain a touch operation period and give an instruction to the accumulation composition control unit 23 not to integrate the pickup image of the subject period with the integrated image.

Figure 10:
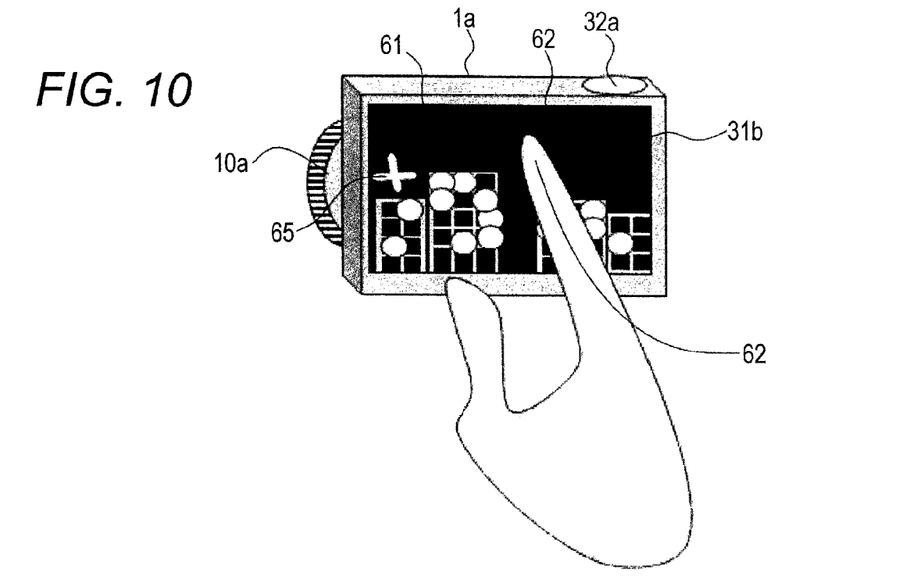
FIG. 10 is a diagram for describing the third embodiment.

FIG. 10 illustrates a situation of the touch operation performed by the user in this case, in which the user touches the display screen 31*b* using a finger 62. The accumulation composition control unit 23 can instruct the correction unit 24 to lower, for example, the level of the image signal of the pickup image picked up during the touch operation period of the user.

Figure 12A:
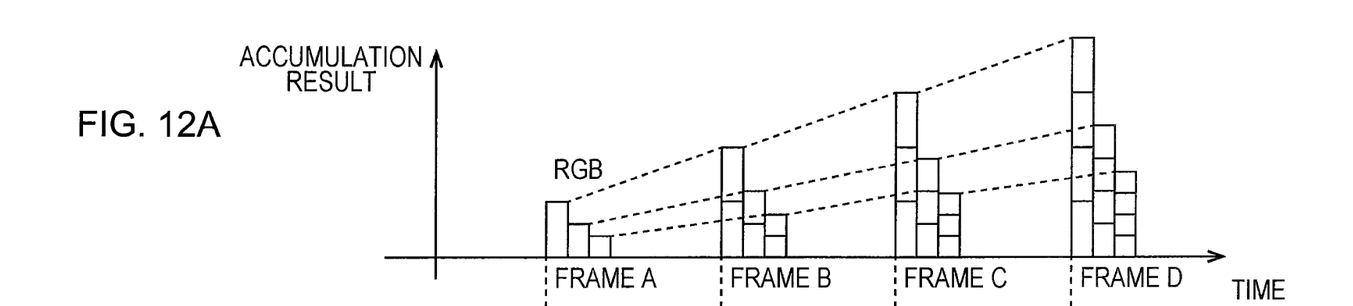
FIGS. 12A and 12B are diagrams for describing the third embodiment.
Figure 12B:
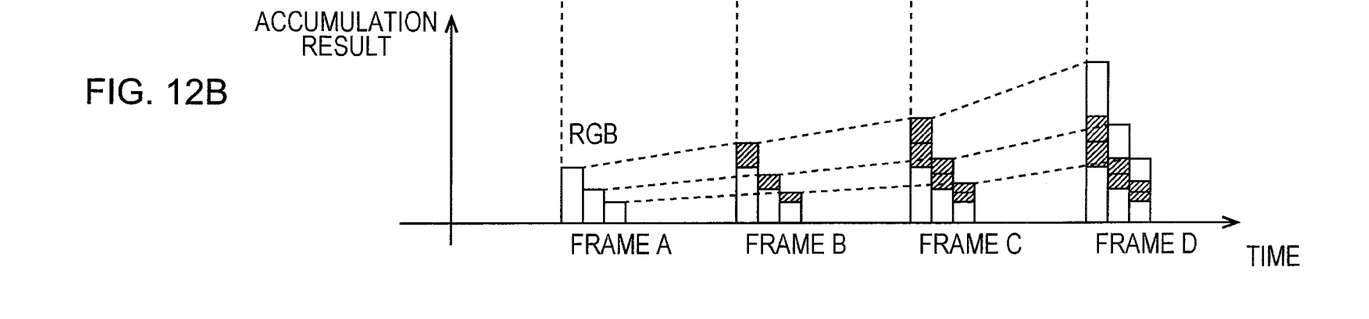

FIGS. 12A and 12B are diagrams for describing the integration result of this case. In FIGS. 12A and 12B, the horizontal axis represents time at an interval of a predetermined time period (one time of photographing) and the vertical axis represents the integration result, in which an example of correction performed by the correction unit 24 is illustrated. FIG. 12A illustrates an example in a case where no correction is performed, and FIG. 12B illustrates an example in which the image signal to be integrated is corrected to be lowered in its signal level. The examples of FIGS. 12A and 12B illustrate a case where the user touches the display screen 31*b* in a period where the photographing of Frames B and C is performed among a series of Frames A to D. The images of Frames B and C obtained through the photographing in this period are lowered in their levels as illustrated with the hatched portions in FIG. 12B, and then subjected to the integration process.

Figure 11:
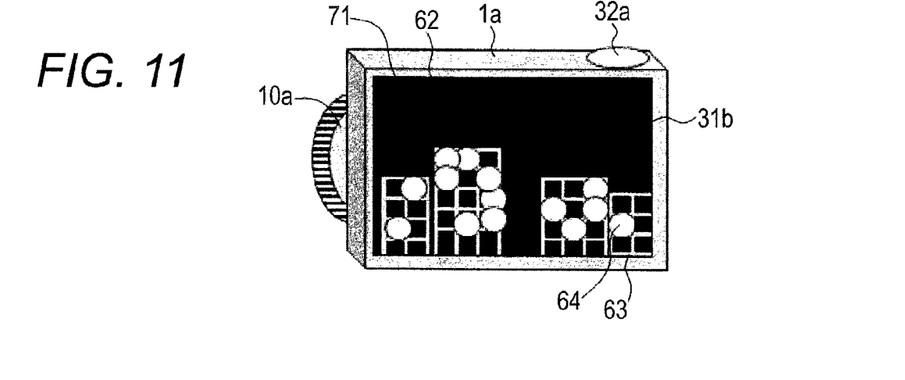
FIG. 11 is a diagram for describing the third embodiment.

FIG. 11 illustrates an image display at the time when the composite photographing is ended after the touch operation of FIG. 10. FIG. 11 illustrates an example in which the level of the image signal of the pickup image obtained during the touch operation period of the user is corrected to become 0 or to be sufficiently lowered by the correction unit 24. In other words, in this case, almost all the pickup images obtained during the period when the user performs the touch operation cannot be integrated for example. Further, in a case where the pickup image is processed to be delayed using a memory for storing the pickup images, the image photographed by the user at timing before the touch operation period may be corrected and integrated. Therefore, in the example of FIG. 11, the image 65 based on the light of the airplane 65 is also corrected and almost not combined.

In this case, it is assumed that a user's satisfaction of the composite image displayed in Step S17 can be designated by "OK" button or "Cancel" button (not illustrated). When it is determined that the "Cancel" button is operated in Step S18, the composite photographing control unit 26 can transfer the process to Step S53 and perform the touch determination and correction process. As an example of the process in Step S53, the same processes as those of Steps S14 and S15 of FIG. 2 can be employed. In this case, the determination on the touch period in Step S52 is canceled, the thumbnails as illustrated in FIGS. 3A to 3D can be displayed, and the composite image in which the unnecessary portion is corrected is obtained. Therefore, the image composition process can be repeatedly performed until the user's desired composite image is obtained.

In this way, in this embodiment, the user can designate a period for integrating the unnecessary pickup image in order to reduce the influence of the unnecessary pickup image. The user can designate the period while referring to the integrated image. Therefore, the user can easily determine the pickup image considered as being unnecessary for the image composition, and can simply acquire a desired composite image.

Furthermore, the digital camera has been described as an example of the photographing device in the respective embodiments of the invention, and it does not matter to use a lens-type camera, a digital single-lens reflex camera, or a compact digital camera as a camera. Furthermore, a camera built in a personal digital assist (PDA) such as a mobile phone or a smart phone may be employed.

In addition, the respective embodiments of the invention may be configured such that the image pickup unit 10 and the control unit 20 are provided in different bodies. More specifically, the embodiments may be implemented by another camera configured such that the control unit 20 is mounted on the PDA or a personal computer and the image pickup unit 10 is not mounted on the PDA or the personal computer.

In addition, even in a case where the invention is applied to the photographing of the moving image, the same configuration as that of this embodiment may be employed. In other words, in FIGS. 3A to 3D, a moving image may be created by sequentially reproducing the thumbnails 41-1 to 41-8. Herein, the moving image may be reproduced after the unnecessary frames (for example, the frames of the thumbnails 41-2, 41-4, and 41-7) are selected based on the user's selection and corrected. Furthermore, when the frames of the thumbnails 41-2, 41-4, and 41-7 are corrected, the moving image may be discontinuous before and after the subject frame. In this case, only a featured portion among the selected images may be corrected. For example, a pixel having a luminance value or a brightness equal to or more than a predetermined value may be corrected among the selected images.

In addition, in a case where the user selects a first designated image (frame) and a second designated image (frame) using the operation device 32 or the touch panel 31*a* when selecting the unnecessary images, all the images (frames) photographed during a period between the time when the first designated image (frame) is photographed and the time when the second designated image (frame) is photographed may be determined as the unnecessary images.

Specifically, the respective embodiments of the invention have been described about the example in which the images are exposed to the light slowly in a dark scene, and the invention may also be applied to a case where the images exposed in a short time are inserted or eliminated. In addition, the invention may be applied to an optical apparatus for an industrial or medical field such as an endoscope or a microscope, or may be applied to a camera such as a monitor camera, an on-vehicle camera, or a desktop camera (for example, a camera attached to a television receiving apparatus or a personal computer). For example, it is also possible to obtain an image from which the unnecessary light in a specimen is deleted for an easy observation by applying the invention to the endoscope or the microscope. Even in an extremely different field such as a non-penetration type periscope for example, the image for inspection or checking is obtained through the recording without observing the image in real time. In this case, the periscope may be influenced by waves, but the observation can be made by deleting such an obstacle portion through the same method as that of the invention.

The invention is not limited only to the above embodiments, but the invention may be embodied by changing the components at an implementation stage without departing from the spirit thereof. In addition, the invention may be made in various forms by appropriately combining a plurality of components disclosed in the respective embodiments. For example, some of the components shown in the embodiments may be removed. Furthermore, the components used over the different embodiments may be appropriately combined.

Further, regarding the claims, the specification, and the operation flows of the drawings, the description has been made using words such as "first" and "next", but these words do not mean that the process is necessarily performed in that order. In addition, it is a matter of course that the respective steps included in the operation flows may be appropriately omitted as long as the step does not affect the gist of the invention.

In addition, among the technologies described herein, the control or function mainly described above using the flowchart may be set by a lot of programs, and the control or function described above can be realized by reading and executing the programs through a computer. The program is a computer program product, part or all of which can be recorded or stored in a portable nonvolatile memory such as a flexible disk or a CD-ROM, and a recording medium such as a hard disk or a volatile memory. Further, the program may be released at the time of shipping the product, or may be distributed or provided through a portable medium or a communication line. The user can easily realize the image pickup apparatus of this embodiment by downloading the program through a communication network and installing the program in a computer, or by installing the program in the computer from a recording medium.

What is claimed is:

1. An apparatus comprising:
a processor comprising hardware, wherein the processor is configured to:
perform a selection operation of selecting one or more pickup images among a time-sequential series of pickup images;
perform a correction operation to correct a brightness of the one or more pickup images selected by the selection operation; and
generate a composite image based on:
one or more pickup images among the series of pickup images not selected; and
a result of the correction operation,
wherein the selection operation comprises:
distinguishing a character portion and an unnecessary portion in the time-sequential series of pickup images based on a handwritten character stroke recognition dictionary; and
selecting the one or more pickup images among the time-sequential series of pickup images, wherein the one or more pickup images contain the unnecessary portion.

2. The apparatus according to claim 1,
wherein the processor is further configured to:
generate one or more integrated images by integrating image signals of a plurality of pickup images among the time-sequential series of pickup images, and
wherein the selection operation of selecting one or more pickup images among the time-sequential series of pickup images comprises:
selecting at least one of the one or more integrated images; and
selecting the one or more pickup images among the time-sequential series of pickup images based on the at least one of the one or more integrated images selected.

3. The apparatus according to claim 2,
wherein the processor is further configured to:
control a display to display one or more thumbnail images corresponding to the one or more integrated images, and
wherein selecting the at least one of the one or more integrated images comprises accepting a selection operation that selects at least one of the one or more thumbnail images displayed by the display that corresponds to the at least one of the one or more integrated images selected.

4. The apparatus according to claim 1,
wherein the processor is further configured to:
control a display to display the one or more integrated images in time sequence in which the one or more integrated images are generated, and
wherein selecting the at least one of the one or more integrated images comprises:
accepting a selection operation that indicates a time period during display of the one or more integrated images; and
selecting the at least one of the one or more integrated images displayed during the time period.

5. The apparatus according to claim 2,
wherein the selection operation comprises:
distinguishing the character portion and the unnecessary portion in the one or more integrated images based on the handwritten character stroke recognition dictionary.

6. The apparatus according to claim 1,
wherein the correction operation comprises correcting a brightness of the one or more pickup images selected by the selection operation such that the brightness of the one or more pickup images is lowered.

7. The apparatus according to claim 1,
wherein the correction operation comprises deleting the one or more pickup images selected by the selection operation.

8. A method comprising:
performing a selection operation of selecting one or more pickup images among a time-sequential series of pickup images;
performing a correction operation to correct a brightness of the one or more pickup images selected by the selection operation; and
generating a composite image based on:
one or more pickup images among the series of pickup images not selected; and
a result of the correction operation,
wherein the selection operation comprises:
distinguishing a character portion and an unnecessary portion in the time-sequential series of pickup images based on a handwritten character stroke recognition dictionary; and
selecting the one or more pickup images among the time-sequential series of pickup images, wherein the one or more pickup images contain the unnecessary portion.

9. A computer-readable storage device storing instructions that, when executed by a computer, causes the computer to:
perform a selection operation of selecting one or more pickup images among a time-sequential series of pickup images;

perform a correction operation to correct a brightness of the one or more pickup images selected by the selection operation; and generate a composite image based on:
- one or more pickup images among the series of pickup images not selected; and
- a result of the correction operation, wherein the selection operation comprises:
- distinguishing a character portion and an unnecessary portion in the time-sequential series of pickup images based on a handwritten character stroke recognition dictionary; and
- selecting the one or more pickup images among the time-sequential series of pickup images, wherein the one or more pickup images contain the unnecessary portion.

* * * * *